July 30, 1968 W. W. GROVES 3,394,680
MACHINE FOR APPLYING TO CYLINDRICAL OBJECTS A CONTROLLED
THICKNESS OF ELECTRICAL COATING MATERIAL
Filed Sept. 21, 1966 6 Sheets-Sheet 4
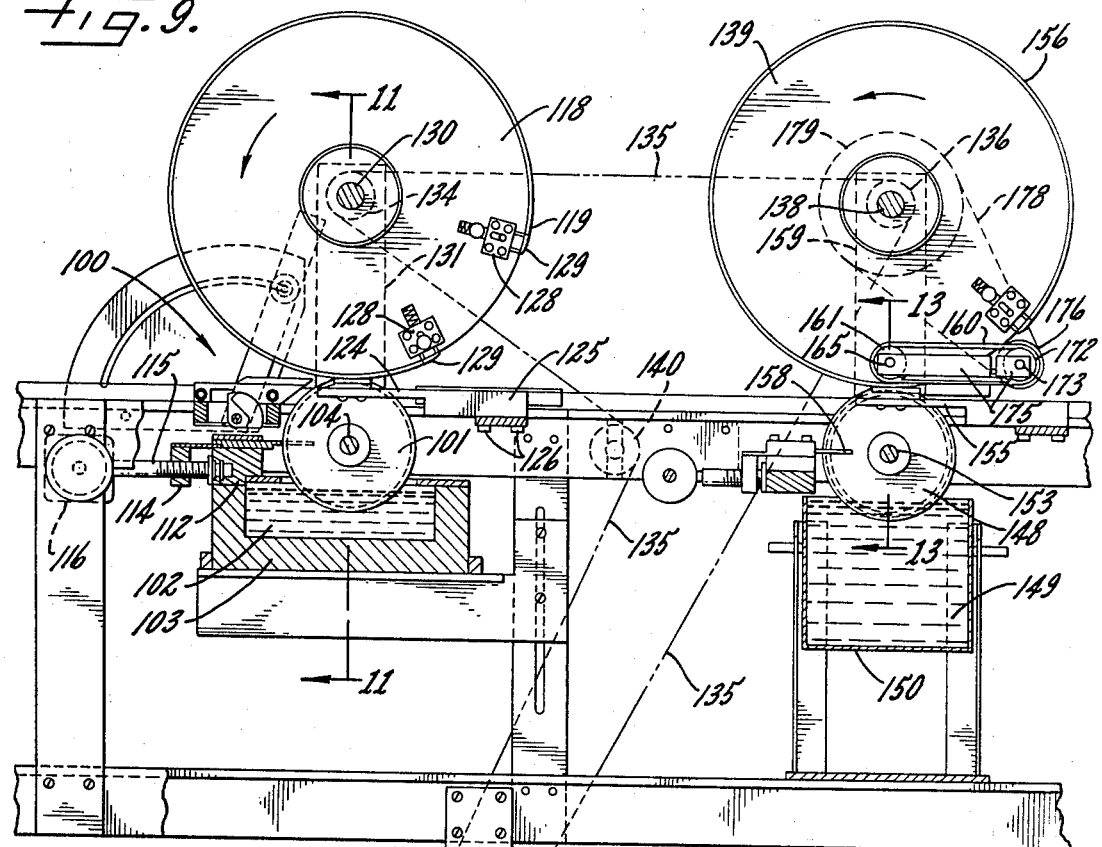
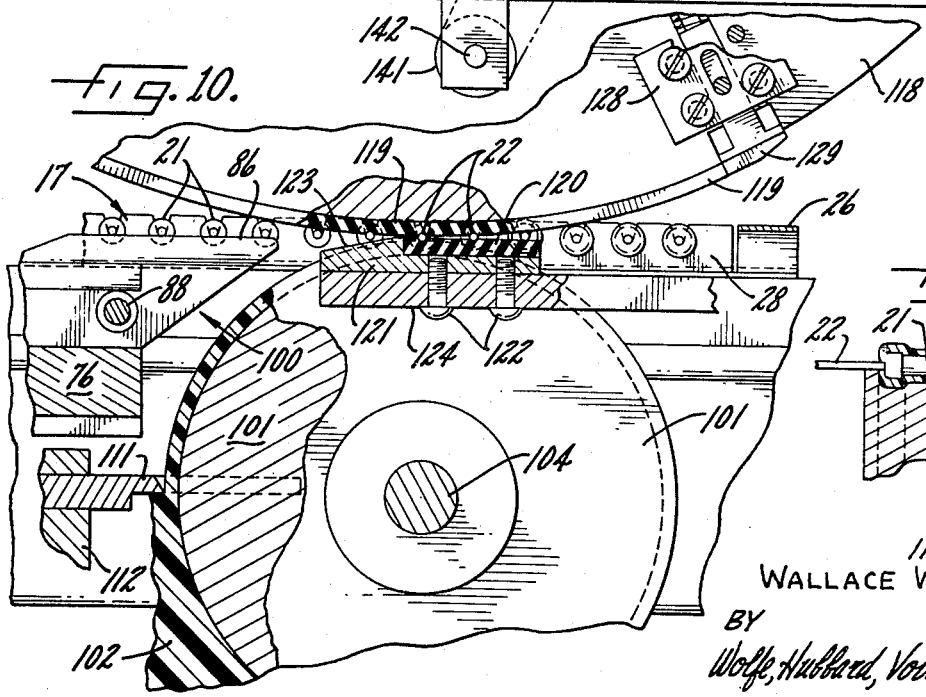
INVENTOR.
WALLACE W. GROVES
BY
Wolfe, Hubbard, Voit & Osann
ATTORNEYS.

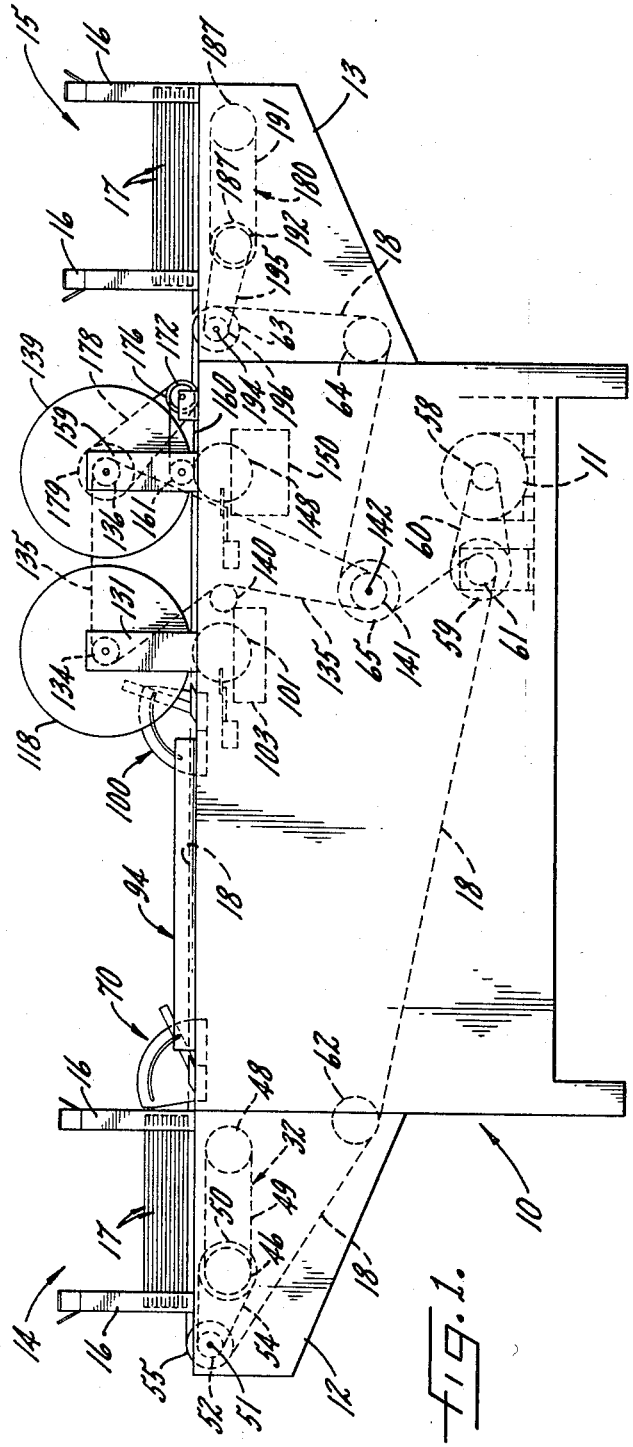

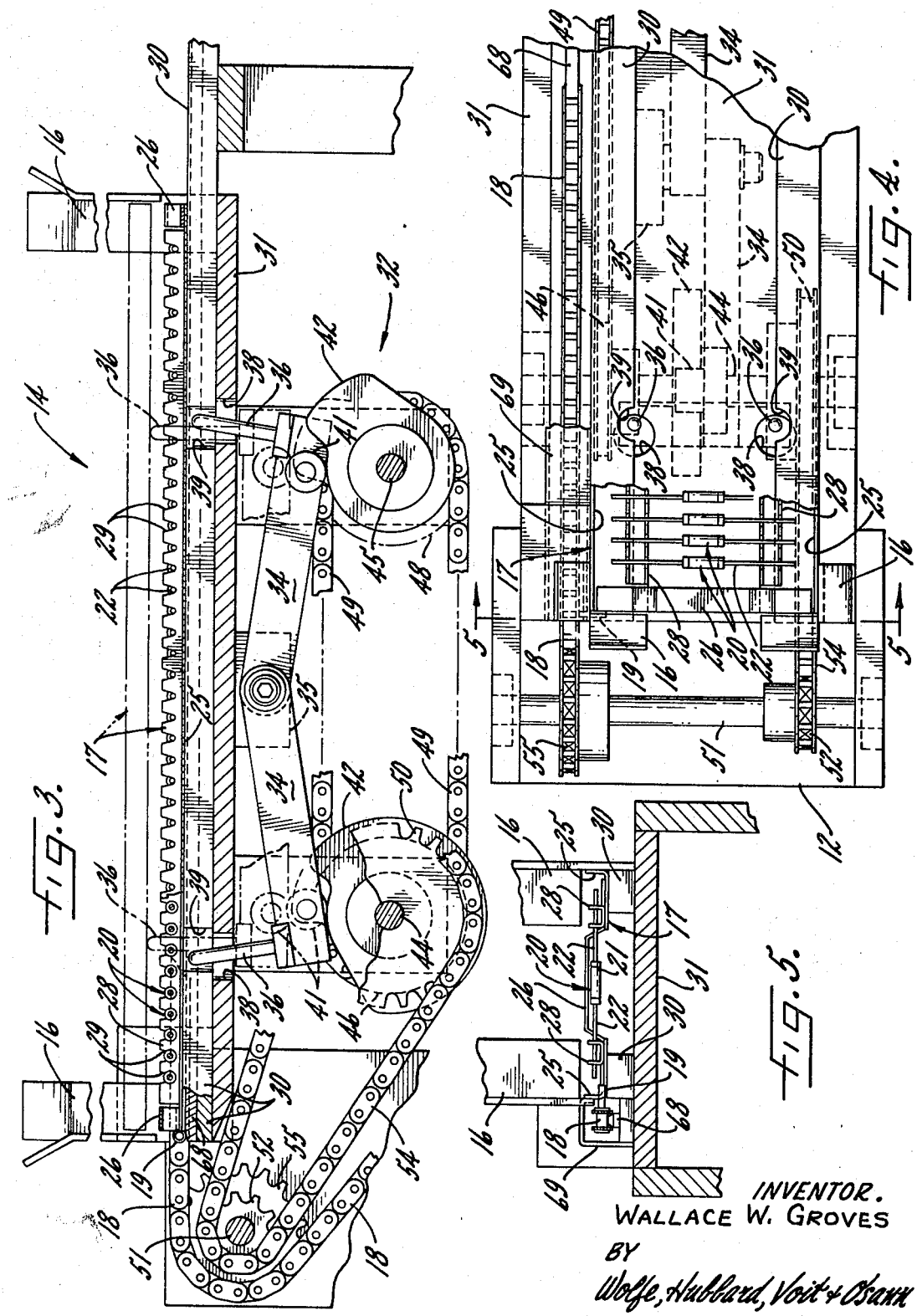

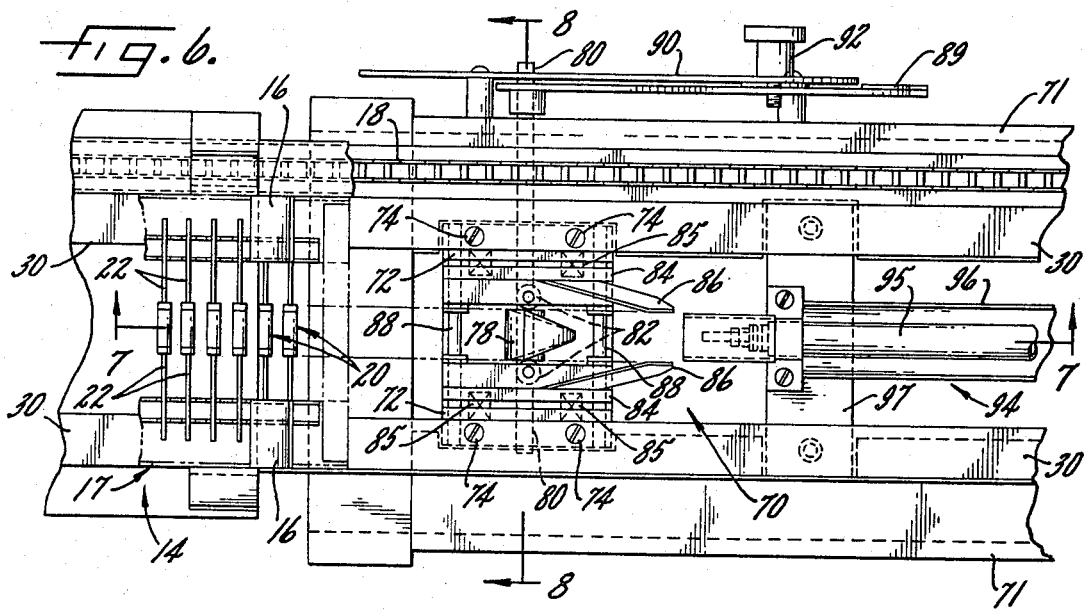
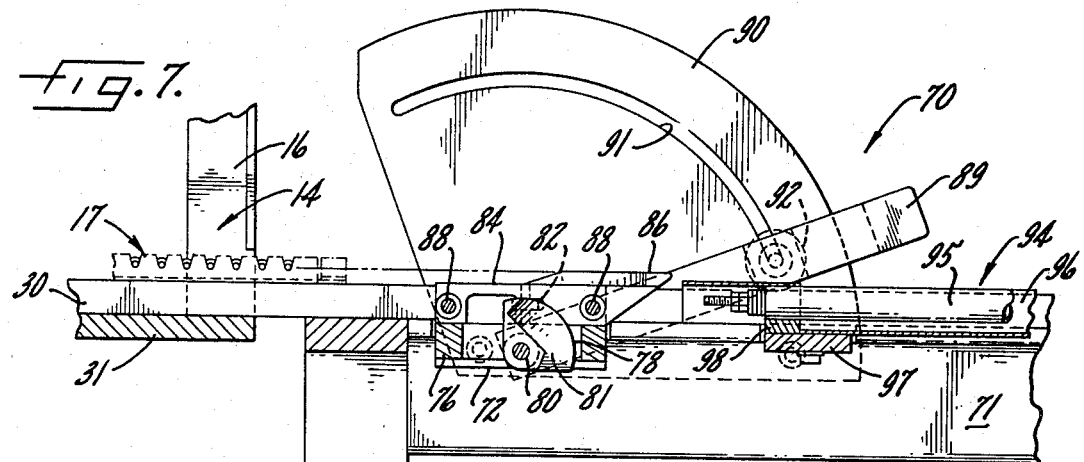
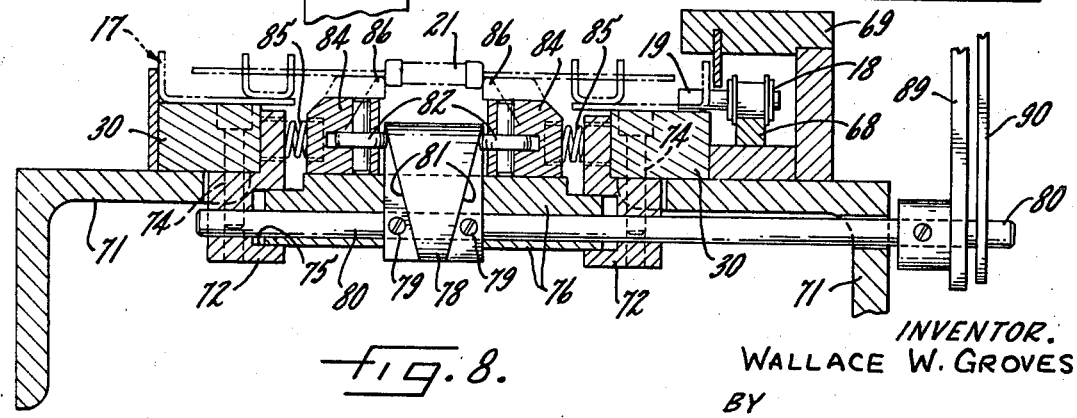

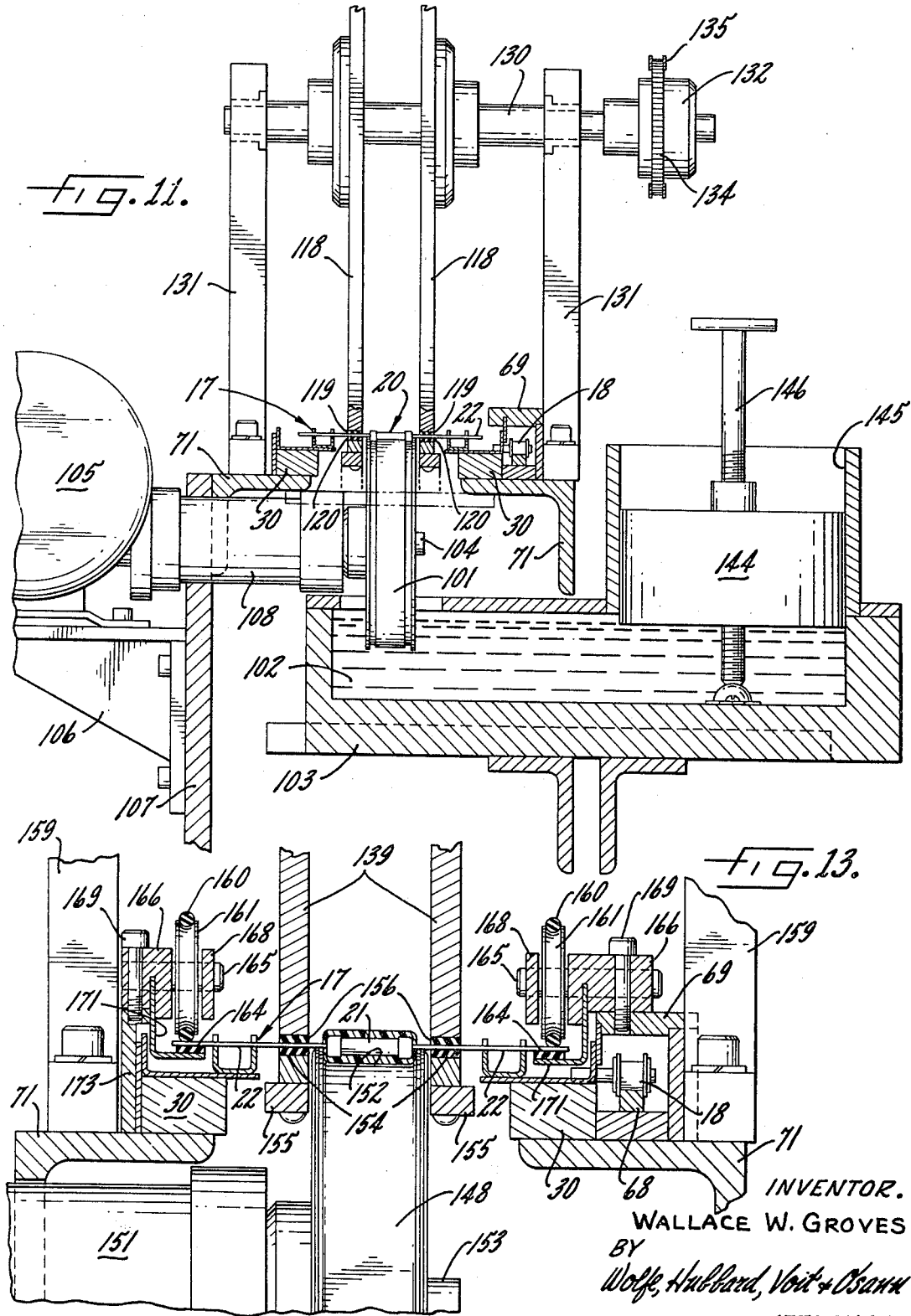

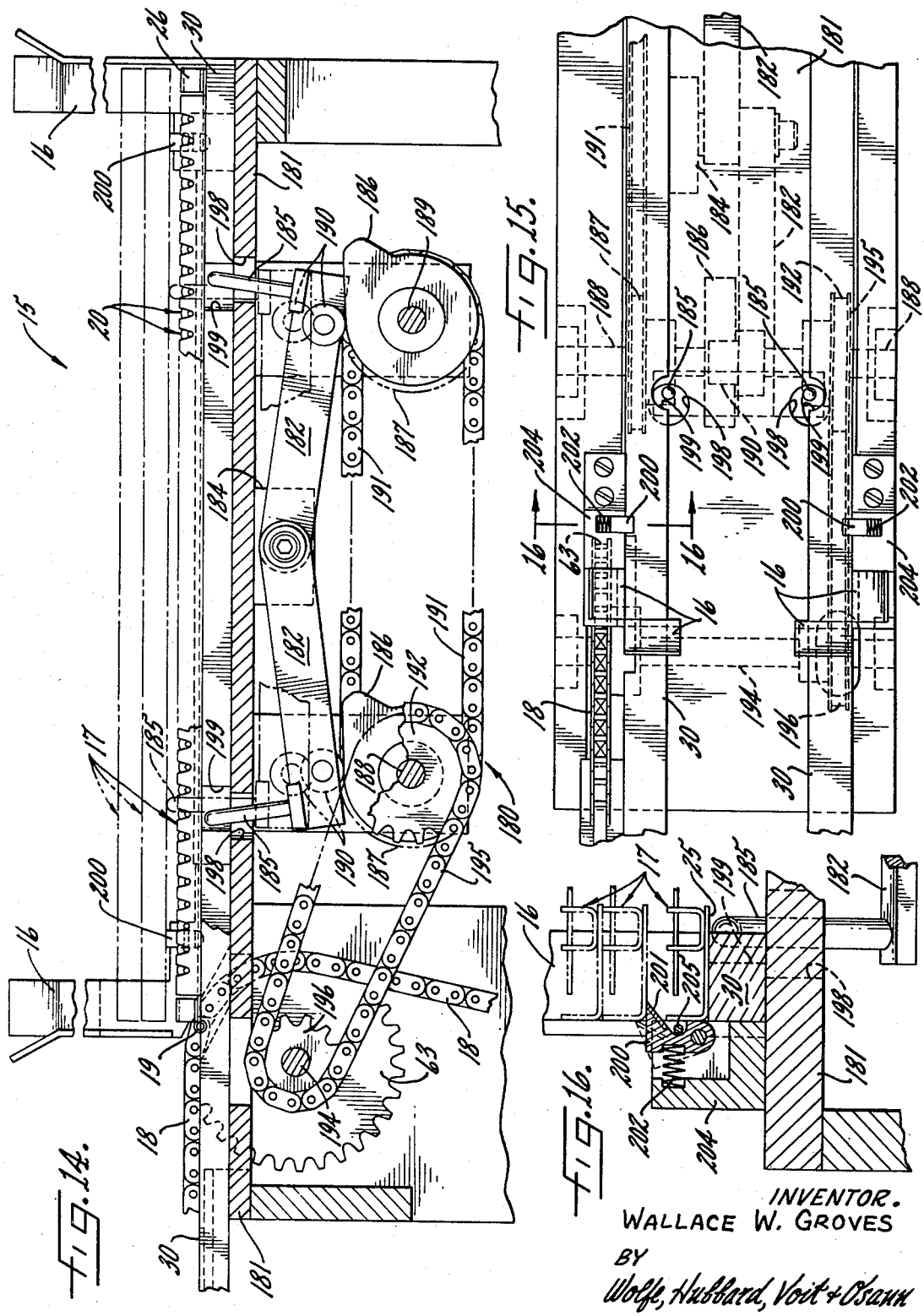

United States Patent Office 3,394,680
Patented July 30, 1968

3,394,680
MACHINE FOR APPLYING TO CYLINDRICAL OBJECTS A CONTROLLED THICKNESS OF ELECTRICAL COATING MATERIAL
Wallace W. Groves, Independence, Kans., assignor to Electra Manufacturing Company, Kansas City, Mo., a corporation of Missouri
Filed Sept. 21, 1966, Ser. No. 581,019
13 Claims. (Cl. 118—232)

ABSTRACT OF THE DISCLOSURE

A coating machine for continuously applying a uniform film of coating material to a plurality of cylindrical elements while the elements are conveyed from a storage rack at one end of the machine to a storage rack at the opposite end. The machine includes a coating application wheel adapted to carry a predetermined quantity of coating material about the outer periphery of the wheel and apply an excessively thick coating of the material to the elements as they pass the wheel. A coating removal wheel having an outer periphery adapted to contact the coated elements then removes the excessive portion of the material so that a predetermined uniform thin film of coating material remains covering the elements. Means are provided for rotating the elements while they pass the coating application and removal wheels so that the coating is uniformly applied and removed, and means further rotate the elements immediately after being conveyed past the coating removal wheel so that the thin film of coating remaining on the elements tends to flow uniformly around the elements.

---

This invention relates to apparatus for applying a film of coating material to cylindrical or tubular elements such as electrical resistors.

It is an object of the invention to provide a novel and improved means for continuously applying a controlled thickness of coating material to a plurality of cylindrical elements.

Another object is to provide a continuous coating machine which is adapted to remove a plurality of cylindrical elements from one storage area, to completely cover the elements with an excessively thick uniform layer of coating material, to remove the excess coating material so that a predetermined thin film of coating remains, and then transport the elements to a second storage area.

A further object is to provide a coating machine as characterized above that is adapted to continuously rotate the cylindrical elements during both the coating application and removal steps so that the coating and removal are more accurately controlled.

Other objects and advantages will become apparent as the foregoing description proceeds, taken together with the accompanying drawings, wherein:

FIGURE 1 is a diagrammatic elevation view of an illustrative coating machine embodying the present invention;

FIG. 2 is a diagrammatic top view of the machine shown in FIGURE 1;

FIG. 3 in an enlarged side elevation in partial section of the automatic tray unstacking device for the machine illustrated in FIG. 1 with solid lines showing the cam down or tray release position of the device and phantom lines showing the cam up or tray holding position of the device;

FIG. 4 is a partial top plane view of the unstacking device shown in FIG. 3 with a portion broken away to show the cams and push rods of the device;

FIG. 5 is a fragmentary vertical section taken in the plane of line 5—5 in FIG. 4;

FIG. 6 is an enlarged partial top plane view of the centering device and heating section of the machine illustrated in FIG. 1;

FIG. 7 is a vertical section of the centering device and heating section taken in the plane of line 7—7 in FIG. 6;

FIG. 8 is a vertical section taken in the plane of line 8—8 in FIG. 6;

FIG. 9 is an enlarged side elevation in partial section of the coating applicator device and coating removal device of the machine illustrated in FIG. 1;

FIG. 10 is an enlarged partial section of the coating applicator wheel and overhead contact wheel shown in FIG. 9;

FIG. 11 is an enlarged side elevation imported section taken in the plane of line 11—11 in FIG. 9;

FIG. 12 is an enlarged fragmentary section of a resistor as it passes the applicator wheel of the machine;

FIG. 13 is a fragmentary section taken in the plane of line 13—13 of FIG. 9;

FIG. 14 is an enlarged side elevation view in partial section of the automatic tray restacking device for the machine illustrated in FIG. 1 with phantom lines showing the cammed up position as a tray is being restacked;

FIG. 15 is a partial top plane view of the restacking device shown in FIG. 14;

FIG. 16 is an enlarged fragmentary section taken in the plane of line 16—16 of FIG. 15.

While the invention is susceptible of various modifications and alternative constructions, certain illustrative embodiments thereof have been shown in the drawings and will be described below in detail. It should be understood, however, that there is no intention to limit the invention to the specific forms disclosed, but, on the contrary, the intention is to cover all modifications, alternative constructions, and equivalents falling within the spirit and scope of the invention as expressed in the appended claims.

Referring more particularly to FIGS. 1 and 2 of the drawings, the invention is there embodied in an illustrative automatic coating machine. The machine comprises a frame 10 which supports an electric motor 11 near the base of the frame and has opposed extensions 12, 13 which support vertical storage racks 14, 15 respectively. The vertical storage racks 14, 15 each are comprised of four upstanding rack guides 16 secured to the frame extensions 12, 13 within which a plurality of trays 17 may be held in stacked relation, each carrying a plurality of electrical resistors 20 to be coated. The machine has a mechanical drive system including a conveyor chain 18 which is powered by the motor 11 to individually propel the trays 17 from the vertical storage rack 14 at one end of the machine, through various operations of the coating process, and then to the storage rack 15 at the opposite end of the machine.

The illustrated machine will be described for use in coating electrical resistors 20 which have a body or element 21 and outwardly extending lead wires 22 at opposed ends. It is understood, however, that the invention also may be useful in coating other electrical elements having axial leads, such as capacitors, or indeed any small object having similar geometry.

The trays 17 which carry the resistors 20 are each formed with a central opening and are adapted to suspend the resistor elements above the opening. As best shown in FIGS. 3, 4, and 5, the illustrated trays are formed with a pair of angles 25 which are held in parallel spaced relation by cross braces 26 which connect corresponding ends of the angles. In order to support a plurality of resistors, a channel 28 is mounted on each angle 25 and the upstanding legs of the channels are formed with a series of uniformly spaced generally V-shaped indentations 29. The outwardly extending lead wires 22 register with corresponding indentations of the channels 28 so that a number of resistors are held in parallel spaced relation on each tray.

In order to control the removal of the trays from the rack 14, an automatic unstacking mechanism 32 is provided beneath the rack. The unstacking mechanism includes a pair of cam operated arms 34 which are rotatably secured to a mounting bracket 35 depending from a base plate 31 and the frame extension 12. At the end of each arm is a rod 36 held perpendicularly to the arm in the upward direction.

When the arms are in the raised position as shown in phantom in FIG. 3, the rods 36 hold the stack of trays in the rods 14 in an elevated position above the level of the conveyor chain 18. When the arms are lowered as shown in solid lines in FIG. 3, the stack of trays is dropped down so that the bottom tray rests on a pair of guide rails 30 and may be engaged by a pin 19 projecting outward from the conveyor chain 18 and be moved along the guide rails 30 out of the rack 14.

The tray guide rails 30 run the entire length of the machine, over which the trays are conveyed past the various stations. The portion of the rails 30 within the rack 14 is supported on the base plate 31. To permit the rods 36 to move upward so as to support the trays above the level of the guide rails 30, and, the base plate 31 and guide rails 30 are formed with openings 38, 39, respectively, through which the rods may pass.

In order to move the arms 34 in timed sequence so that the bottom tray is positioned on the guide rail at the appropriate time to be engaged by the conveyor chain pin 19, a pair of cams 42 are mounted on shafts 44, 45 below the arms 34 and cooperate with cam followers 41 rotatably mounted on the arms 34. The cams 42 are driven through a mechanical connection from the motor 11. The cam shafts 44, 45 are each provided with equal sized sprockets 46, 48 which are connected by a chain 49. The shaft 44 carries a second sprocket 50 which is connected to the shaft 51 by a sprocket 52 and chain 54. The shaft 51 carries a sprocket 55 which is driven by the conveyor chain 18.

In the illustrated machine as shown in FIG. 1, in order to drive the conveyor chain 18, the motor 11 drives a sprocket 58 which is connected to a sprocket 59 by a chain 60. A sprocket 61 which is co-axial with the sprocket 59 drives the conveyor chain 18. The conveyor chain 18 operates around sprockets 61, 62, 55, 63, 64, 65, with some of these sprockets being adapted to drive various other mechanisms of the machine.

Thus, the cams 42 of the unstacking device are operated from the conveyor chain 18 and cause the arms 34 to be moved up and down in unison. Each time the arms 34 are lowered, the bottom tray in the stack rests on the guide rails 30 and is free to be moved out of the rack when the pin 19 of the conveyor chain 18 abuts against the angle 25 of the tray.

To insure the proper position of the pin 19 against the tray, the chain 18 rides on a chain guide 68 and a shield 69 is provided to prevent interference with the chain movement. A number of pins 19 are appropriately spaced along the conveyor chain 18 so as to engage a tray each time the arms are lowered.

In carrying out the invention, an adjustable centering device 70 is provided in the path of the tray which, when preset to the size resistors being coated, orients each resistor to an exact centered location on the tray. As shown in FIGS. 6-8, the centering device is held between two angles 71 which extend the approximate length of the machine and support the tray guide rails 30. A hanger 72 is secured to each guide rail 30 by screws 74 which set within a counter-bored hole so that the head of the screw is below the upper surface of the guide rails. The hangers 72 are formed with opposed channels 75 which seat a horizontal plate 76 formed with a central opening within which a cam 78 is held. The cam 78 is secured by a pair of set screws 79 to a rod 80 which passes laterally through, and is supported by, the hangers 72, the plate 76, and one of the angles 71.

The cam 78 is formed with a pair of inwardly tapered camming surfaces 81 as shown in FIG. 8. The camming surfaces 81 cooperate with a pair of follower rollers 82 which are positioned on opposite sides of the cam 78 and are biased into contact with the camming surfaces 81 by springs 85 interposed between the follower brackets 84 and the hanger 72. The follower brackets 84 are each formed with upwardly and inwardly projecting aligners 86. Brackets 85 are mounted on shafts 88 which are anchored to the hangers 72 and permit lateral movement of the bracket and aligner. When the cam 78 is positioned so that the front tips of the aligners are spaced apart the length of the cylindrical body portion 21 of the resistors being conveyed, the resistors 20 are guided between the aligners as they move along and are centered on the tray.

In order to facilitate adjusting the space between the aligners to accommodate the particular resistor size being run through the machine, the end of the cam shaft 80 is provided with an adjusting lever 89. Thus, when the lever is moved, the cam 78 is revolved, changing the separation of the follower bracket 82 and aligners 86.

To secure the cam 78 at a specified aligner position, a radial dial 90 is secured to the angle 71 adjacent the lever and is formed with a radial slot 91. An adjusting screw 92 is provided which passes through the slot 91 and is held in a threaded hole in the lever 89. When the screw 92 is tightened, the lever 89 is unable to move with respect to the dial and the cam is therefore held in position, setting the space between the aligners 86. When the screw is loosened, the lever is free to rotate the cam to a new position with the screw riding along the radial slot.

Immediately following the first centering device 70, the trays move into a heated section 94. Pre-heating the resistors has been found to aid adhesion of the plastic compound which is applied to the resistors during the coating operation.

In the illustrated embodiment, heat is applied by an infrared heating element 95 of any well-known type which is centered between the angles 71 at the approximate level of the tray guide rails 30 so that the trays 17 pass directly over the heating element 95. To direct the heat upward to the trays, the heating element is disposed within a semicircular trough 96 having the upper side open. The heating element is held a specified distance above the trough by a spacer 98. Both the heating element and the trough are supported at each end by plates 97 secured between the angles 71. Preferably, an ambient temperature in the range of 230° F. should be maintained in the heated section.

After leaving the heated section, the tray is then propelled over second centering device 100 which insures that the resistors are exactly positioned on the tray immediately before they are coated. This second centering device 100 shown in FIG. 9 is identical to the first centering device and need not be described in detail.

In accordance with the invention, the machine is adapted to coat the cylindrical resistor elements with a predetermined uniform thin film of coating material as they are being conveyed toward the second storage racks. To this end, the machine is provided with a coating application means for applying an excessively thick coating of coating material to the cylindrical elements as they are being conveyed, a means for rotating the elements while being coated so that the coating is uniformly applied, a coating removal means adapted to contact the elements and remove the excessive portion of the coating material, a means for rotating the elements while in contact with the coating removal means so that the coating is uniformly removed and a predetermined uniform thin film of coating remains on the elements, and a means for further rotating the elements after being conveyed past the coating removal means so that the remaining thin film of coating on the elements tends to flow uniformly around the resistors.

The coating application means is shown in FIGS. 9–12 and includes a coating applicator wheel 101 supported in a vertical plane so that the lower portion of the wheel is submerged in a plastic coating compound 102 held in an open top container 103 and the top portion of the wheel extends slightly above the level of the tray guide rails 30. The applicator wheel is mounted on a shaft 104 horizontally extending from a motor 105 supported on a motor mount 106 secured to a side panel 107 of the machine frame. The motor 105 is provided with a gear head 108 which preferably is adapted to reduce the rate the applicator wheel revolves so that the peripheral velocity of the wheel approaches the speed of the moving trays.

The applicator wheel 101 is formed with a peripheral channel 110 having a container similar to, although proportionately larger than, the cylindrical resistor elements 21 to be coated as shown in FIG. 12. When the applicator wheel 101 is revolved through the plastic coating material 102, substantial amounts of the coating material adhere to the periphery of the wheel. In order to control the amount of coating material the wheel is permitted to carry through each revolution, a wiper blade 111 is mounted adjacent the wheel above the container so as to rub against the wheel. The wiper blade permits only the peripheral channel 110 of the wheel to be filled with coating material with the excess material falling back into the container 103.

Since preferably the channel 110 of the applicator wheel conforms to the size resistor elements being coated, the applicator wheel 101 must be replaced by a wheel having a different channel configuration each time different sized resistors are run through the machine. To facilitate changing the applicator wheel, it is mounted at the end of the shaft 104 extending from the motor 105 so that it can be readily removed and replaced by another wheel.

In order to insure that the wiper blade 111 is properly positioned at all times and especially after a different applicator wheel 101 is installed, means are provided for horizontally adjusting the blade 111 with respect to the applicator wheel. The blade 111 is slidably disposed in a mounting block 112 secured to the top of the container 103. The blade has a depending flange 114 at one end which is in threaded engagement with a screw 115. The screw 115 is rotatably held at one end in the mounting block 112 by a thrust bearing while the opposite end is connected to a right angle drive 116 which may be turned by an appropriate handle. Thus, by turning the screw 115, the depending flange 114 is advanced or retracted along the length of the screw permitting the blade to be adjusted.

To insure that the level of the coating compound 102 in the container 103 is maintained sufficiently high so that the applicator wheel is coated without continuously adding additional solution to the container, a plunger 144 is provided which may be adjustably lowered into the container to raise the level of the liquid. The plunger 144 is slidably disposed in the spout 145 which extends upward from the container. A plunger bolt 146, which is rotatably secured to the container, carries the plunger 144 and is in threaded engagement therewith. It is apparent that by turning the plunger bolt 146, the plunger 144 is moved vertically upward or downward.

Since the top of the applicator wheel 101 extends slightly above the level of the tray guide rails 30, as a tray is conveyed along, each resistor element 21 will contact the coating material carried in the applicator wheel channel 110 at a point that is a few degrees before the resistor reaches a top dead center position above the revolving applicator wheel. In order that the coating material is applied uniformly to the resistors after they contact the applicator wheel, means are provided for rotating the resistors at a constant rate during the period the resistor is passing the applicator wheel and is in contact therewith. To this end, two large overhead wheels 118 are provided which are adapted to be revolved so that the resistor lead wires 22 will come into contact with the lower moving surfaces of the wheels 118 and be rotated as they are conveyed past the applicator wheel. To facilitate the rolling action of the resistors, the wheels have a rubber bonded strip 119 about their periphery and flat rubber pads 120 are provided immediately adjacent the resistor cores 21 in a horizontal plane approximately level with the lead wires 22 so that the lead wires are rolled against the pads 120 by the overhead wheels as they pass the applicator wheel.

As the tray 17 approaches the applicator wheel, the lead wires 21 of each resistor are guided onto the rubber pads 120 by a front inclined guiding surface 123 formed on a plate 121 upon which the pads 120 are bonded. The plates 121 are secured by screws 122 to the pair of laterally projecting spaced arms 124 of a mounting plate 125 which is held to the machine frame by screws 126.

In the illustrated embodiment, the rubber strip 119 on each overhead wheel 118 encompasses approximately 312° of the wheel circumference with the remaining segment left vacant to bridge the space between trays which pass between the rotating wheels. To insure that the ends of the rubber strip 119 come into gradual contact with the lead wires and do not flare out after continued use, a clamp 128 having a tapered rubber surface 129 is provided at each end of the rubber strip 119. The clamps 128 fit within a radial slot adjacent each end of the strip 119 and may be secured by any appropriate fastener.

The overhead wheels 118 are mounted on a shaft 130 that is rotatably disposed between large upstanding brackets 131. In order to rotate the overhead wheels, one end of the shaft 130 is provided with a hub 132 carrying a sprocket 134 which is chain driven from the motor 11. A chain 135 operates around the sprocket 134, as well as a sprocket 136 on shaft 138 for a second set of overhead wheels 139, an idler 140 which maintains the chain 135 clear of the coating application apparatus, and a sprocket 141 mounted on shaft 142. As shown in FIG. 1, the chain 135 is driven by the shaft 142 which is powered from the primary motor 11. It is apparent that in designing the sprockets, the overhead wheels 118 may be rotated at any desired constant rate.

The overhead wheels 118 are rotated in the counter-clockwise direction as viewed in FIG. 9 so that the bottom surface of the wheels moves in the same direction as the trays 17 are being conveyed. Preferably the peripheral velocity of the wheels 118 should be in the direction the trays are traveling and should exceed the speed of the trays so as to cause the resistors to rotate a sufficient number of times while in contact with the applicator wheel so that the resistors become completely covered with a coating of material.

Since the channel 110 of the applicator is filled with coating material, an excessively thick coating is applied to the resistors during the coating application. It should be appreciated that although the intended end result is to have a uniform thin film covering the resistor elements, the initial thick coating insures that the resistors are completely covered without more difficult area being left exposed.

It also should be appreciated that the overhead wheels 118 not only cause the resistors to be rotated at a constant rate through the coating material so that the resistors may be uniformly covered, but also aid in preventing the lead wires of the resistors from being misaligned during the coating application. Thus, after the resistors have passed the coating applicator wheel, they remain properly positioned on the trays for the next operation.

In keeping with the invention, after a tray of resistors is conveyed past the coating application wheel, means are provided for removing the excessive portion of the coating material applied so that a predetermined thin uniform film remains covering the resistor. As best shown in FIGS. 9 and 13, a coating removal wheel 148 is supported in a vertical plane with the lower portion of the wheel being submerged in a solvent 149 held in an open top container 150 and the top portion of the wheel extending to the approximate level of the resistors being conveyed. The coating removal wheel is supported on a shaft 153 laterally extending from the gear head 151 of an electric motor of a type similar to that described for the coating applicator wheel.

In order to accurately control the thickness of the coating, the coating removal wheel 148 is formed with a peripheral channel 152 which is complementary to the desired shape of a coated resistor. As the trays 17 are conveyed along the tray guide rails 30, the resistor elements 21 contact the channel surface of the revolving coating removal wheel 148, causing a portion of the coating material to be removed from the elements.

To facilitate the uniform removal of the excess coating material, a pair of overhead wheels 139 identical to the overhead wheels 118 at the coating station are provided which are adapted to rapidly rotate the resistors during the time they are in contact with the coating removal wheel. The two overhead wheels 139 are supported on a shaft 138 rotatably disposed between two upstanding mounting brackets 159 and are driven by the chain 135 which also drives the overhead wheel at the coating station.

As at the coating station, rubber strips 156 are provided above the periphery of the overhead wheels, and rubber pads 154 are mounted on plates 155 at the approximate level of the traveling resistor lead wires. Thus, the rubber strips 156 on the overhead wheels 139 roll the lead wires against the pads 154 so that the resistor element is rapidly rotated against the coating removal wheel, causing the excessive material to be drawn off leaving a thin film covering the resistor which is determined by the difference between the shape of the channel 152 and the uncovered element 21.

Preferably, the coating removal wheel is driven at a rate so that the surface velocity of the channel is slightly greater than the forward velocity of the resistors, thus causing the excess coating material to be pulled from the element ahead of the path of resistor travel. The solvent 149 through which the lower portion of the coating removal wheel 148 passes cleans the coating material from the removal wheel 148. An adjustable wiper 158 substantially identical to the wiper used at the coating station removes the excessive solvent from the coating wheel so that the wheel is clean when it contacts the resistors. The coating removal wheel, as with the applicator wheel, is readily removable from its shaft so as to be easily replaced by a wheel adapted for different sized resistors.

When contact between the resistor carrier and the coating removal wheel is terminated, it has been found that there is a tendency for the coating material to build up on the resistor at the point where the resistor abruptly separates from the wheel. In further carrying out the invention, means are provided for prolonging the rotation of the resistors after they separate from the coating wheel so that any separation deformity in the coating material that may exist is caused to flow evenly around the resistor and thus insure a more uniform film. To this end, round rubber belts 160 are revolved around sheeves 161, 172 above the extreme ends of the resistor lead wires so that the lower portions of the belts, which are driven in the direction of the tray movement, contact the lead wires as the resistors leave the coating removal wheel 148. A fixed rubber pad 164 is located directly beneath each belt 160 at the approximate level of the lead wires. The belts 160 and pads 164 preferably should be positioned with respect to the overhead wheels 139 so that the resistor lead wires 22 contact the belt 160 while still being rotated by the overhead wheels so that rotation is uninterrupted.

In the illustrated embodiment, the front sheeves 161 of each pair of sheeves are rotatably disposed on a shaft 165 secured in a mounting block 166. A plate 168 is pressed on the end of the shaft 165 to maintain the sheeves in place. One of the mounting blocks 166 is fastened by screws 169 to the shield 69 which encloses the chain conveyor 18 while the other mounting block is similarly secured to a plate 173 adjacent the guide rails 30. The rolling pads 164 are each held on the horizontal leg of an angle support 171 secured to the mounting block 166 so that the top surface of the pads 164 are the approximate level of the resistor leads and so that a space is maintained between the horizontal leg of the angle 171 and the guide rail 30 to permit a tray to be conveyed along the guide rails without interference. As shown in FIGURE 9, the rear sheeves 172 are held on a common shaft 173 which is rotatably held at the end of a support plate 175.

In order to power the round belts 160, the shaft 173 for the rear sheeves 172 carries a sprocket 176 which is driven by a chain 178 through a sprocket 179 carried by the shaft 138 for the overhead wheels 139. As is apparent in FIGURE 9, since the overhead wheels are revolved in a counterclockwise direction as shown in that view, the rear sheeves 172 cause the lower portion of the round belts to move in the direction of tray movement.

After a tray is conveyed past the revolving round belts 160 and rotation of the resistors is terminated, the resistor elements are completely and uniformly coated with a film having a controlled thickness. The tray of coated resistors may then be removed at the discharge end of the machine to complete the operation.

In the illustrated embodiment as shown in FIGURES 14–16, an automatic restacking mechanism 180 is provided which is similar to the unstacking mechanism 32 described above. The stacking device is located at the discharge end of the machine below the horizontal panel 181 of the frame extension 13 and the storage rack 15. As shown in FIGURE 14, the conveyor chain 18 causes each tray to be moved along the tray guide rails 30 so that at the end of its travel the tray is positioned over the stacking device 180. When the tray is in position above the stacking device, the driving pin 19 of the conveyor chain disengages the tray as the pin is carried around the sprocket 63.

The stacking device includes a pair of cam operated arms 182 similar to the arms of the unstacking device described above. The arms 182 are rotatably secured to a mounting bracket 184 depending from the horizontal frame plate 181. At the end of each arm 182 is a rod 185 disposed perpendicularly to the arm in the upward direction.

In order to impart upward and downward movement to the arms 182 in timed sequence, a pair of cams 186 are mounted on shafts 188, 189 below the arms 182 and cooperate with cam followers 190 rotatably secured on the arms 182. The cams 186 are connected by a chain 191 which operates around sprocket 187 mounted on the cam shafts 188, 189. To drive the cams, the cam shaft 188 carries a sprocket 192 which is connected to the shaft 194 by a chain 195 and sprocket 196. The shaft 194 is driven by the conveyor chain 18.

The cams 186 are designed so that the arms 182 rest in a lowered position with the rods 185 below the level of the guide rails 30 as shown in FIGURE 14 when a tray is being moved into the storage rack 15. When the movement of the tray is terminated, the cams are adapted to force the arms 182 upward causing the rods 185 to pass through holes 198, 199 in the plate 181 and guide rails 30, respectively, and contact the angle 25 of the tray to raise it to an elevated position as shown in phantom in FIGURE 14.

In order to maintain a tray in the elevated position, spring operated latches 200 are provided directly adjacent and above both guide rails 30 which are adatped to permit the upward passage of trays but prevent the return of the trays to the lowered position. Each latch 200 comprises a rotatable latch member 201 and a spring 202 contained within a housing 204 secured to the frame plate 181 adjacent the tray guide rails 30. The spring 202 is biased between the latch member 201 and the back wall of the housing 204, and a pin 205 is provided to limit the outward movement of the latch member. Thus, as shown in FIGURE 16, when the latch is biased outward, it is adapted to hold a stack of trays in the storage rack and still permit another tray to be conveyed into the rack along the guide rails 30. When the next tray is elevated by the arms 182, the tray causes the latch to be forced into the housing 204 against the force of the spring 202 so as not to interfere with the upward passage of the tray. When the tray has moved above the latch member 201, the spring causes the latch again to be forced outward against the stopping pin so as to act as a support for the elevated trays when the arms are lowered.

As can be seen from the foregoing detailed description, the machine of the present invention is adapted to continuously apply a precisely controlled uniform thickness of coating material to a plurality of resistors or other cylindrical elements. The machine removes the resistors from one storage area, completely covers the resistor elements with an excessively thick uniform layers of coating material, then removes the excess coating so that a predetermined thin film of coating remains on the elements, and then transports the coated resistors to a second storage area.

I claim as my invention:

1. A coating machine for continuously applying a uniform film of coating material to a plurality of cylindrical elements comprising, in combination, a means for conveying said elements along said machine, a coating application wheel for carrying a predetermined quantity of coating material about the outer periphery of said wheel and applying an excessively thick coating of said material to said elements while being conveyed, means for rotating said elements while being coated so that said coating is applied uniformly, a coating removal wheel having an outer periphery adapted to contact said elements while being conveyed and remove the excessive portion of said coating material, means for rotating said elements while in contact with said coating removal wheel so that said coating is uniformly removed and a predetermined uniform thin film of coating remains on said elements.

2. The coating machine of claim 1 including a means for further rotating said elements immediately after being conveyed past said coating removal means so that the rotation of said elements is uninterrupted and the remaining thin film of coating on said elements tends to flow uniformly around said elements.

3. A machine for continuously applying a uniform film of coating material to a plurality of cylindrical elements comprising, in combination, a plurality of trays each carrying a number of said elements and being adapted to be conveyed along said machine, a coating application wheel adapted to apply an excessively thick coating of said material to said elements while said elements are being conveyed, means for rotating said elements with respect to said tray and coating application wheel while said elements are being coated so that said coating is uniformly applied, a coating removal wheel adapted to contact said coated elements while being conveyed and remove the excessive portion of said coating material, means for rotating said elements with respect to said tray and coating removal wheel while in contact with said coating removal wheel so that said coating material is uniformly removed and a predetermined thin film of coating remains on said elements, and means for further rotating said elements so that there is uninterrupted rotation of said elements for a period after being conveyed past said coating removal wheel so that the thin film remaining on said elements tends to flow uniformly around said element.

4. The coating machine as defined in claim 3 in which a container holding a quantity of said coating material is disposed beneath said coating application wheel so that said wheel is partially submerged in said coating material, said coating application wheel being adapted to be revolved so that substantial quantities of said material adhere to the periphery of said application wheel, means for controlling the amount of coating material compound said wheel is permitted to carry through each revolution, and a container of solvent disposed beneath said coating removal wheel so that said coating removal wheel is partially submerged in said solvent whereby said wheel is maintained in a clean condition when contacting said carriers.

5. The coating machine of claim 3 in which said cylindrical elements have axial extensions at opposed ends and are adapted to be suspended in said trays by said extensions, said means for rotating said elements while being coated includes an overhead wheel rotatably mounted above said applicator wheel, a pair of flat rolling pads the approximate level of the axial extensions of said elements so that said extensions pass over the rolling pads as the elements are conveyed past said applicator wheel, said overhead wheel being adapted to be revolved so that the peripheral edge of said overhead wheel contacts said axial extensions as they pass over the rolling pads causing said extensions to be rotated against said rolling pads and said elements to be revolved while being coated, said means for rotating said elements while passing said coating removal wheel includes a second overhead wheel rotatably mounted above said coating removal wheel, a second pair of flat rolling pads the approximate level of the axial extensions of said elements so that said extensions pass over said rolling pads as the elements are conveyed past said coating removal wheel, and said second overhead wheel being adapted to contact said axial extensions as they pass over said second rolling pads causing said extensions to be rotated against said pads and said elements to be revolved while contacting said removal wheel.

6. The coating machine of claim 5 in which said further means for rotating said elements includes a pair of belts each mounted around a pair of shives, a third pair of rolling pads positioned directly below said belts at the approximate level of the axial extensions of said elements so that the extensions pass over said rolling pads while passing said coating removal wheel, said belts being adapted to be driven by said shives so that a portion of said belts contact said axial extensions while passing over said third rolling pads causing additional rotational movement to said elements after passing said coating removal wheel.

7. A machine for continuously applying a uniform film of coating material to a plurality of cylindrical elements comprising, in combination, means for conveying a plurality of said elements along said machine, a coating applicator wheel formed with a peripheral channel having a contour similar to the shape of said elements with increased proportions, means for containing a quantity of said coating material beneath said coating applicator wheel so that said wheel is partially submerged in said coating material, said coating applicator wheel being adapted to be revolved so that substantial amounts of said material adhere to the peripheral channel of said wheel, means adjacent said coating applicator wheel for controlling the amount of material the wheel is permitted to carry through each revolution, said coating application wheel being positioned with respect to the line of travel of said elements so that said elements tangentially contact said coating material held in said peripheral channel of said wheel, means for rotating said elements with respect to said coating application wheel while said elements contact the coating material on said wheel so that a uniform excessively thick coating of material is applied to said elements, a coating removal wheel formed with a peripheral channel having a shape complementary to the final shape of a coated element, said coating removal wheel being positioned with respect to the line of travel of said elements so that said elements tangentially contact the peripheral channel of said wheel, said coating removal wheel being adapted to be revolved so that when the elements contact said wheel a portion of said coating is removed, means for rotating said elements with respect to said coating removal wheel while in contact with said wheel so that said coating material is uniformly removed and a predetermined uniform thin film of coating remains on said elements, an open container of solvent disposed beneath said coating removal wheel so that said wheel is partially submerged in said solvent whereby the coating removal wheel is maintained in a clean condition when in contacting said elements, and means for further rotating said elements so that there is uninterrupted rotation of said elements for a period after being conveyed past said coating removal wheel whereby the remaining thin film of coating material tends to flow uniformly around said elements.

8. The coating machine of claim 7 in which said coating applicator wheel is revolved at a rate so that the peripheral surface velocity of said wheel is approximately the same as the speed said elements are conveyed along said machine, and said coating removal wheel is revolved at a rate so that the peripheral velocity of said wheel is slightly greater than the speed said elements are conveyed along said machine so that excessive coating material is pulled from said elements ahead of their path of travel.

9. The machine of claim 7 in which the means for conveying said elements includes a plurality of trays having a central opening and being adapted to be conveyed along said machine, said elements having axial extensions at opposed ends and being adapted to be suspended over the central opening of said trays by said extensions, said means for rotating said elements while being coated includes a overhead wheel rotatably mounted above said applicator wheel, a pair of flat rolling pads the approximate level of the axial extensions of said elements so that said extensions pass over the rolling pads as the elements are conveyed past applicator wheel, said overhead wheel being adapted to be revolved so that the peripheral edge of said overhead wheel contacts said axial extensions as they pass over the rolling pads causing said extensions to be rotated against said rolling pads and said elements to be revolved while being coated, said means for rotating said elements while passing said coating removal wheel includes a second overhead wheel rotatably mounted above said coating removal wheel, a second pair of flat rolling pads the approximate level of the axial extensions of said elements so that said extensions pass over said rolling pads as the elements are conveyed past said coating removal wheel, and said second overhead wheel being adapted to contact said axial extensions as they pass over said second rolling pads causing said extensions to be rotated against said pads and said elements to be removed while contacting said removal wheel.

10. A machine for continuously applying a uniform film of coating material to a plurality of cylindrical elements comprising, in combination, a plurality of trays each adapted to carry a plurality of elements, means for storing a plurality of said trays at one end of said machine, means for automatically unstacking said trays individually and conveying said trays along said machine, means for aligning said elements on said trays while being conveyed so that said elements are in proper position for coating, a heat source for preheating said elements before applying said coating material, a coating application wheel adapted to apply an excessively thick coating of said material to said elements while said elements are being conveyed, means for rotating said elements with respect to said tray and coating application wheel while said elements are being coated so that said coating is uniformly applied, a coating removal wheel adapted to contact said elements while being conveyed and remove the excessive portion of said coating material, means for rotating said elements with respect to said tray and coating removal wheel while in contact with said coating removal wheel so that said coating material is uniformly removed, means for further rotating said elements after being conveyed past said coating removal wheel so that the coating material remaining on said elements tends to flow uniformly around said elements, and means for automatically stacking said trays after said elements have been coated.

11. The coating machine of claim 10 in which the means for aligning said elements on said trays includes a cam positioned below the line of travel of said elements, a pair of cam followers spaced apart by said cam and being adapted to guide said moving elements to a predetermined position on said tray, and said cam being adjustable so as to vary the position of said followers to accommodate different sized elements which may be conveyed along said machine.

12. The coating machine of claim 10 in which said elements have axial extensions at opposed ends and are adapted to be supported on said trays by said extensions, said applicator wheel being formed with a peripheral channel conforming generally to the shape of said elements, means for containing a quantity of said coating material beneath said coating application wheel so that said wheel is partially submerged in said coating material, said coating application wheel being adapted to be revolved so that substantial amounts of said material adheres to the peripheral channel of said wheel, means adjacent said coating applicator wheel for controlling the amount of material the wheel is permitted to carry through each revolution, said coating application wheel being positioned with respect to the line of travel of said elements so that said elements tangentially contact said coating material held in said peripheral channel of said wheel, said means for rotating said elements with respect to said coating application wheel includes an overhead wheel rotatably mounted above said applicator wheel, said overhead wheel being adapted to contact the axial extensions of said elements so as to impart rotation to said elements while in contact with said applicator wheel, said coating removal wheel being formed with a peripheral channel having a shape complementary to the final desired shape of a coated element, said coating removal wheel being positioned with respect to the line of travel of said elements so that said elements tangentially contact the peripheral channel of said wheel, said coating removal wheel being adapted to be revolved so that when the elements contact said wheel a portion of said coating is removed, and said means for rotating said elements with respect to said coating removal wheel includes a second overhead wheel rotatably mounted above said coating removal wheel and being adapted to contact the axial extensions of said elements so as to impart rotation to said elements while in contact with said coating removal wheel.

13. The coating machine of claim 1 in which said coating application and removal wheels each are formed with a peripheral channel substantially complementary to the shape of said elements.

References Cited

UNITED STATES PATENTS

| | | | |
|---|---|---|---|
| 570,538 | 11/1896 | Burns | 118—107 |
| 1,672,737 | 6/1928 | Skinner | 118—107 X |
| 2,153,295 | 4/1939 | Brogden | 118—107 |
| 2,430,187 | 11/1947 | Recker | 118—107 |
| 2,683,436 | 7/1954 | Marantz | 118—107 X |
| 3,015,303 | 1/1962 | Slohlquist | 214—6.2 |

CHARLES A. WILLMUTH, *Primary Examiner.*

ROBERT I. SMITH, *Assistant Examiner.*